United States Patent
Palett et al.

[19]

[11] Patent Number: 6,114,954
[45] Date of Patent: Sep. 5, 2000

[54] LUGGAGE CARRIER WITH ILLUMINATION MEANS

[76] Inventors: Anthony P. Palett, 31458 Hunters Cir., Farmington Hills, Mich. 48331; Gil Spear, 915 Sea Grape La., Vero Beach, Fla. 32963

[21] Appl. No.: 09/283,021

[22] Filed: Apr. 1, 1999

Related U.S. Application Data

[60] Provisional application No. 60/080,318, Apr. 1, 1998.

[51] Int. Cl.[7] .................................................. B60Q 1/34
[52] U.S. Cl. ...................... 340/475; 340/476; 340/477; 340/478; 362/73; 224/326; 224/321
[58] Field of Search .................... 340/475, 476, 340/477, 478; 362/73; 224/326, 325, 321

[56] References Cited

U.S. PATENT DOCUMENTS

| | | | |
|---|---|---|---|
| 2,652,650 | 9/1953 | Helms et al. | 40/129 |
| 3,375,365 | 3/1968 | Gross | 240/7.1 |
| 3,784,974 | 1/1974 | Hamashige | 340/67 |
| 3,802,103 | 4/1974 | Neff | 40/129 C |
| 4,087,124 | 5/1978 | Wiley, Jr. | 296/1 S |
| 4,114,789 | 9/1978 | Blaylock et al. | 224/42.1 E |
| 4,269,339 | 5/1981 | Bott | 224/325 |
| 4,277,009 | 7/1981 | Bott | 224/309 |
| 4,426,028 | 1/1984 | Bott | 224/325 |
| 4,534,496 | 8/1985 | Bott | 224/326 |
| 4,800,470 | 1/1989 | Hartsaw | 362/73 |
| 5,171,083 | 12/1992 | Rich | 362/73 |
| 5,255,164 | 10/1993 | Eidelman | 362/80 |
| 5,306,156 | 4/1994 | Gibbs et al. | 439/34 |
| 5,511,708 | 4/1996 | Cronce et al. | 224/321 |
| 5,511,709 | 4/1996 | Fisch | 224/321 |
| 5,549,940 | 8/1996 | Noone | 428/31 |
| 5,553,761 | 9/1996 | Audoire et al. | 224/321 |
| 5,577,649 | 11/1996 | Lee, Jr. et al. | 224/321 |

*Primary Examiner*—Daniel J. Wu
*Assistant Examiner*—Tai T. Nguyen
*Attorney, Agent, or Firm*—Gifford, Krass, Groh, Sprinkle, Anderson & Citkowski, PC

[57] ABSTRACT

An illuminated roof/luggage rack for automobiles and other vehicles incorporates turn indicators and/or side lights to enhance noticeability and safety. Preferably, the turn indicators are provided on all four corners of the rack structure, and the side lights run the entire length of the side members. Rear-facing braking lights may also be provided, all of which are operated in conjunction with the vehicle's electrical system. In one alternative embodiment, rows of lights on either side alternate ON and OFF to attract additional attention by appearing to flicker up and down or to simulate wave sequences. A somewhat different alternative embodiment includes illuminated side lettering or decorations. Such indicia, which may be permanent or changeable, may be used to exhibit commercial or personal messages, for example for HELP or for other announcements. The preferred embodiment also includes convenient electric power outlets disposed at one or more of the four corners of the structure, also interconnected to the vehicle's electrical system through an inverter to produce line voltage. Side rails with broad bases are preferably used to reduce load deflection in the event that thin roof sheet-metal is all that is available at the point of mounting attachment. As opposed to self-illumination, a further alternative embodiment instead illuminates the roof of the vehicle itself.

20 Claims, 10 Drawing Sheets

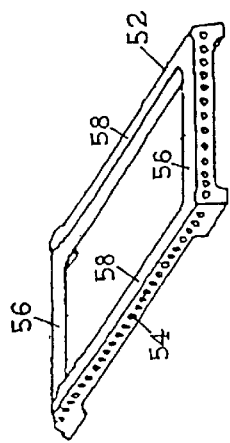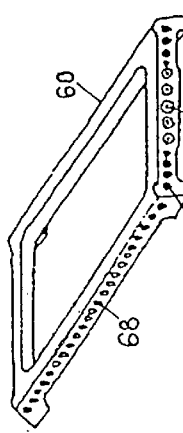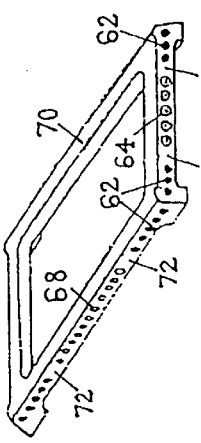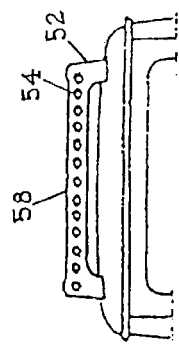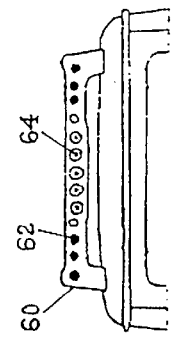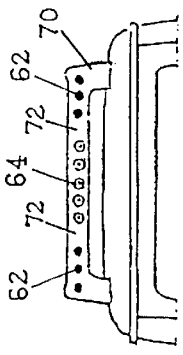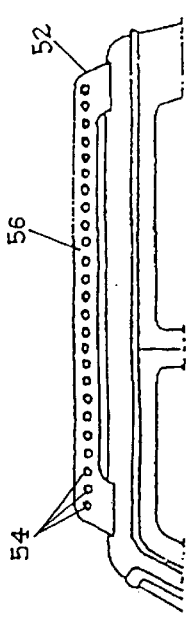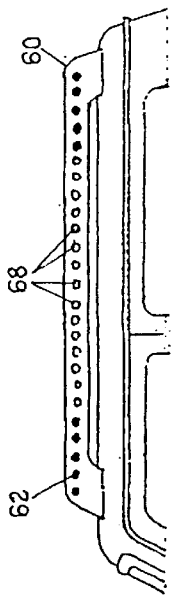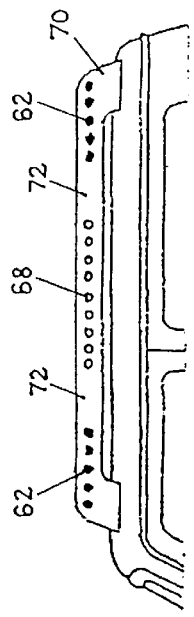

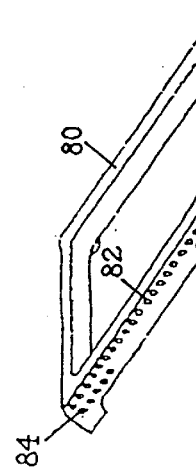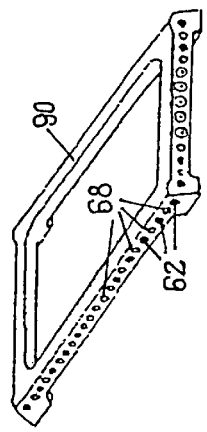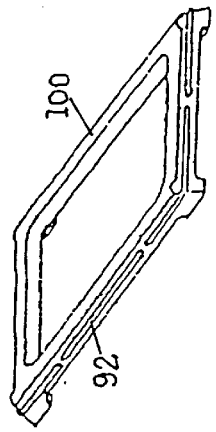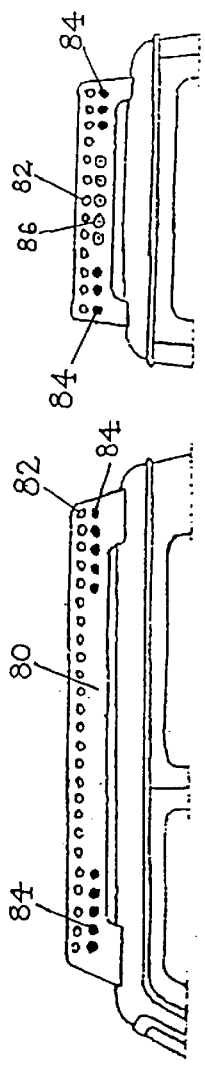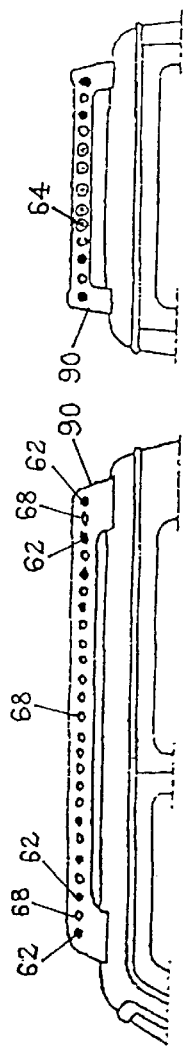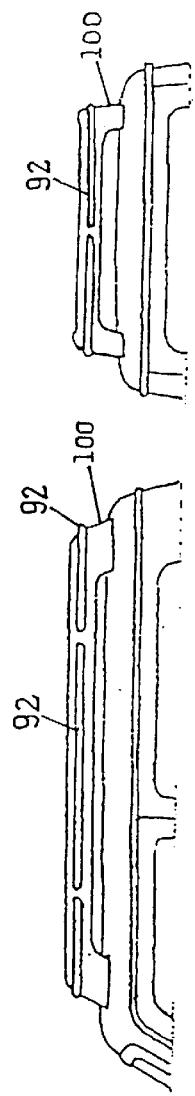

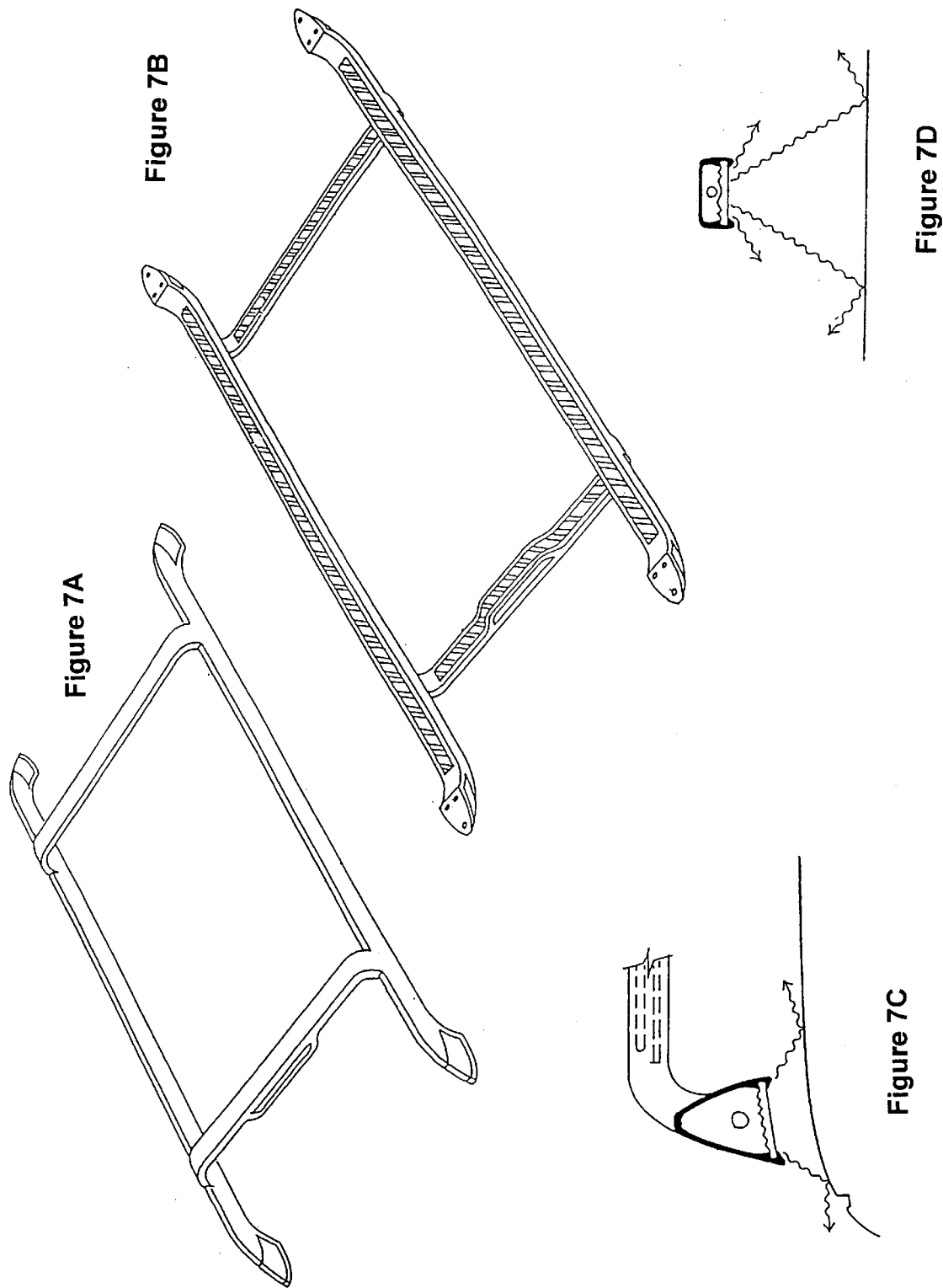

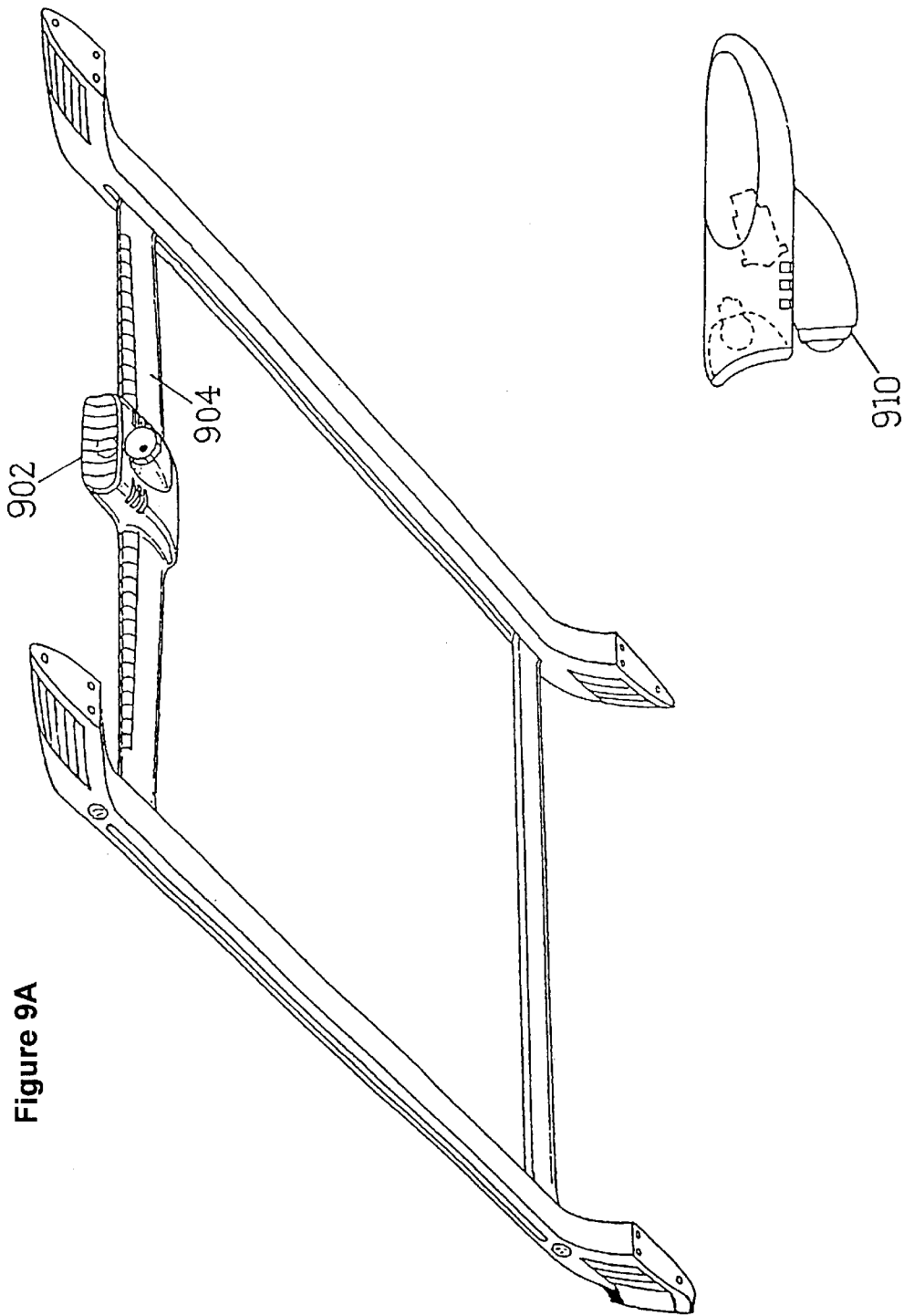

LUGGAGE CARRIER WITH ILLUMINATION MEANS

REFERENCE TO RELATED APPLICATION

This application claims priority of U.S. provisional application Ser. No. 60/080,318, filed Apr. 1, 1998, the entire contents of which are incorporated herein by reference.

FIELD OF THE INVENTION

The present invention relates generally to vehicular luggage carriers and roof-racks, and, in particular to an illuminated and electrically powered roof-rack for automobiles and other vehicles.

BACKGROUND OF THE INVENTION

Luggage carriers are currently available, either as original equipment or as after-market accessories, and are designed for mounting either on the roof or the upper surface of the trunk of a vehicle. Such carriers, which are typically formed of metal, plastic or a composite, were originally designed to allow luggage or other items to be secured for transport. However, modern, stylishly designed luggage carriers have become popular for their aesthetic appeal, as well as for their functionality.

Another popular vehicle accessory is auxiliary or ornamental lighting, which provides both functional and aesthetic benefits. The functional benefits of auxiliary lighting include enhanced visibility of the vehicle for safety, as well as the illumination of the vehicle itself for convenience. Many drivers also prefer auxiliary lighting to enhance the aesthetics of the vehicle. Such additional lighting may include roof lights, running board lights, fog lights, cab lights, and ground-effect lights.

SUMMARY OF THE INVENTION

The present invention resides in an illuminated and electrically powered roof-rack for automobiles and other vehicles. In contrast to existing luggage carriers with auxiliary lights, roof-rack configurations according to the invention are primarily self-illuminating for the purpose of noticeability. In addition, with few exceptions, the inventive carriers are meant to be illuminated and used while moving or in traffic, not just while parked or when loading.

In a preferred embodiment, an illuminated roof-rack according to the invention lights up substantially its entire length on both sides to increase side noticeability. Turn indicators are preferably provided on all four corners, as are rear-facing braking lights, all of which are operated in conjunction with the vehicle's exterior operating lights. The preferred embodiment also includes convenient electric power outlets near all four corners which are interconnected to the vehicle's electrical system. Side rails with broad bases are preferably used to reduce load deflection in the event that thin roof sheet-metal is all that is available at the point of mounting attachment.

Alternative embodiments include some or all of the features just introduced. In addition, in one alternative embodiment, rows of lights on either side alternate ON and OFF to attract additional attention by appearing to flicker up and down or to simulate wave sequences. A somewhat different alternative embodiment includes illuminated side lettering or decorations. Such indicia, which may be permanent or changeable, may be used to exhibit commercial or personal messages, for example for HELP or for other announcements.

As opposed to self-illumination, a further alternative embodiment instead illuminates the roof of the vehicle itself. This version is applicable in situations where regulations prohibit directly seen lights on roof-racks or at their level. Two embodiments are disclosed according to this version of the invention, one with turn indicators and braking lights, and another without such lights.

BRIEF DESCRIPTION OF THE DRAWINGS

FIGS. 7A–7D illustrate an embodiment of the invention wherein downwardly directed lights are provided to illuminate at least portions of the top surface(s) of the vehicle;

FIGS. 9A–9B illustrate, from different perspectives, an alternative configuration according to the invention wherein, in particular, a centrally-located pod is used to house a rear-view video accessory, back-up audible alarm and/or back-up lamp.

DETAILED DESCRIPTION OF THE INVENTION

Figure 1:
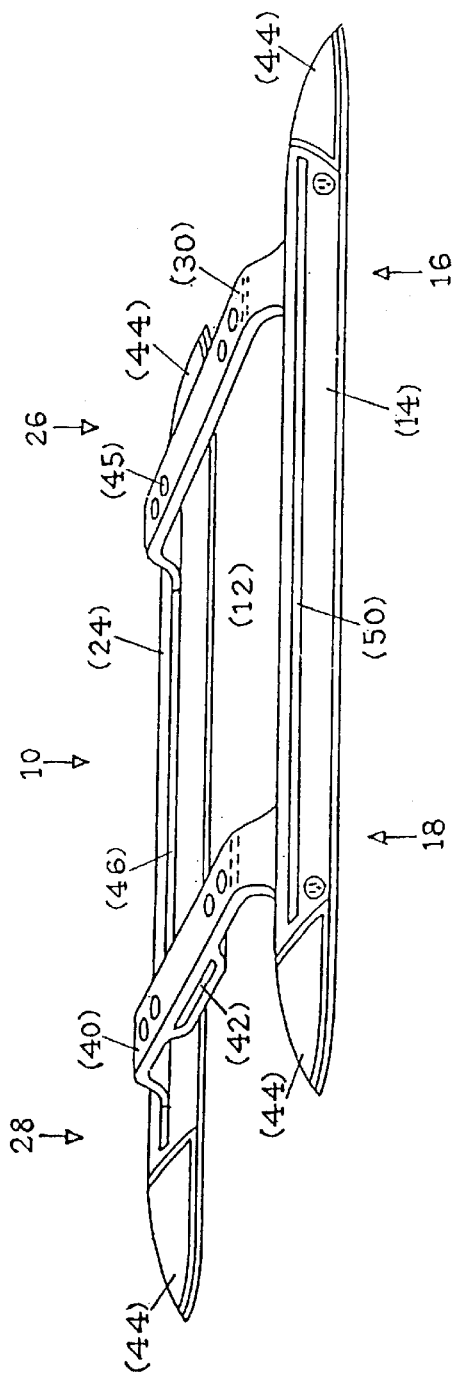
FIG. 1 is an isometric view of a luggage carrier with illumination means according to the invention.
Figure 2:
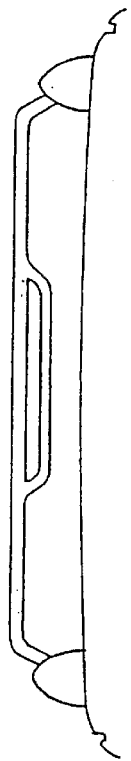
FIG. 2 is a rear view of the luggage carrier of FIG. 1.

Referring to FIGS. 1 and 2, a luggage carrier with illumination means according to the invention is generally shown at 10. The luggage carrier 10, which is configured to be mounted on a roof of a vehicle (12), preferably includes a first elongated side member 14 and a second elongated side member 24. The side members 14 and 24 are preferably mounted generally parallel to each other and parallel to the lengthwise axis of the vehicle. The first side member 14 has a front portion 16 positioned towards the front of the vehicle and a rear portion 18 located towards the rear of the vehicle 12. Likewise, the second side member 24 has a front portion 26 and a rear portion 28. The luggage carrier 10 further includes a first transverse member 30 interconnecting the front portion 16 of the first side member 14 with the front portion 26 of the second side member 24. A second transverse member 40 interconnects the rear portion 18 of the first side member 14 with the rear portion 28 of the second side member 24.

In a preferred embodiment, the luggage carrier 10 includes a braking lamp 42 integrated with the second transverse member 40, which is visible from behind a vehicle equipped with the luggage carrier 10. The braking lamp 42 is preferably integrated into the underside of the second transverse member 40 so that it does not interfere with luggage or other items being strapped to the upper side of the member 40. Tie-down holes 45 are optionally provided for securing luggage or other items onto the rack.

The front and rear cross-bars 30 and 40 preferably slide forward or backward and lock into place to accommodate different loads, much like currently available members of this type. However, to ensure that electrical power is at all times delivered to at least the rear cross-bar to activate the brake light, the adjustment slots (such as item 46) include electrified rails that cooperate with electrodes on at least one of the ends of the engaging cross bar, similar or identical to systems currently in use with track lighting.

The embodiment depicted in FIGS. 1 and 2 also includes four turn indicator lamps 44, one integrated into each of the front and rear portions 16, 18, 26, and 28 of the first and second side members 14 and 24. By virtue of the physical arrangement shown, the turn indicator lamps 44 are visible from both the front and rear of a vehicle 12 on which the luggage carrier 10 is installed, providing increased visibility of a driver's intention to turn or merge.

Such positioning of the turn indicator lamps 44 on the roof of the vehicle 12 should therefore enhance safety by providing highly visible turn signals in a position easily seen from large vehicles such as buses and trucks. The luggage rack 10 also preferably includes side visibility lamps 50 (such as 50) integrated into the outside surface of each of the side members 14 and 24. The side lamps 50 enhance both the visibility and the aesthetics of a vehicle 12 with the luggage rack 10 installed.

Figure 3:
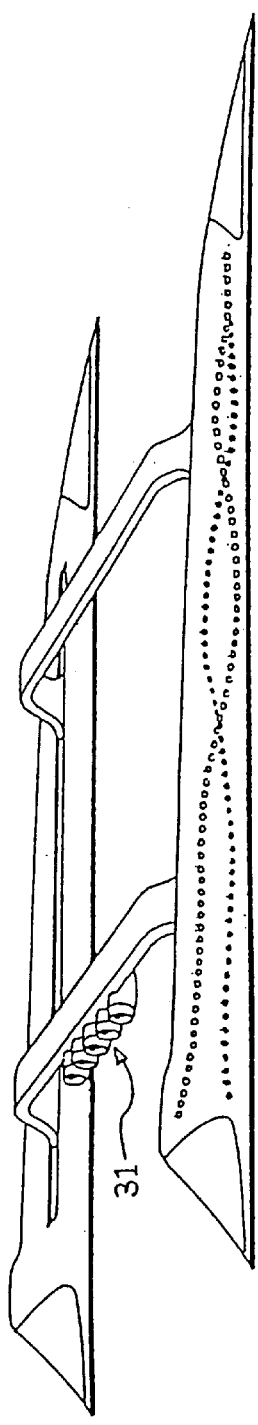
FIG. 3 is an isometric view of an alternative embodiment wherein the side lights are provided in multiple rows.
Figure 4:
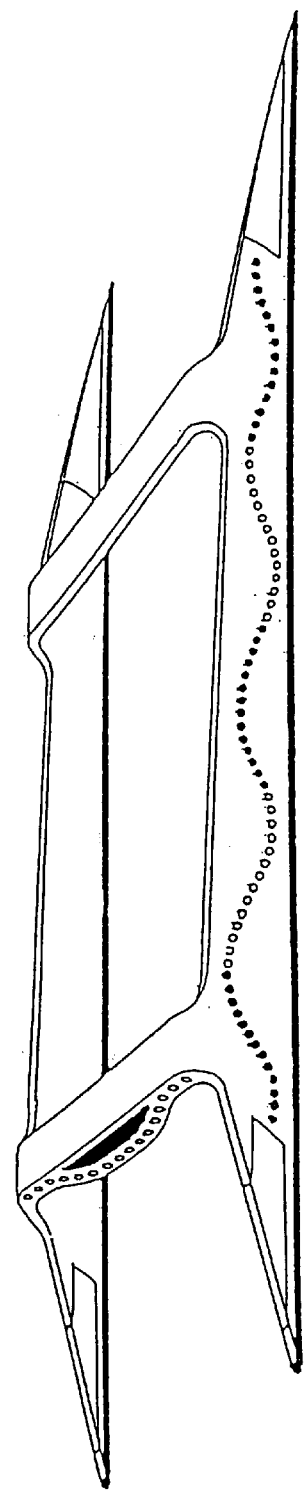
FIG. 4 is an isometric view of a further alternative embodiment wherein the side lights are provided as small groups which appear to travel along the side of the rack.

FIGS. 3 and 4 illustrate alternative embodiments wherein the side lights may be provided in multiple rows (FIG. 3) or as small groups which appear to travel along the side of the rack (FIG. 4). The multiple rows of lights preferably turn ON and OFF alternately, as shown in FIG. 3, wherein one row is shown ON and the other OFF. The rows may consist of small lamps placed closed together as shown, or may consist of continuous tubular lamps, or by shorter tubular lamps placed end to end. The rearward facing lights on the rear cross-bar may all be used to indicate braking, or only the center lights may be used for such purpose, with the outer left and right lamps acting as turn indicators. If enough lamps are provided they may be operated as sequential turn indicators; that is, the innermost of each set turns ON first and turns OFF just as the middle one turns ON, which turns OFF just as the outermost one turns ON, after which the sequence is repeated.

The row of lights on the roof-rack drawn above in FIG. 4 consists of closely spaced small lamps which are turned ON and OFF progressively and continuously one at a time or in small groups so that light from them appears to the viewer to travel along the side of the rack. There may be more then one row and the rows my cross one another or be aligned in any pattern or direction or be located on the cross-bars as well as the sides so as to be noticeable in any or all directions.

Figure 5A:
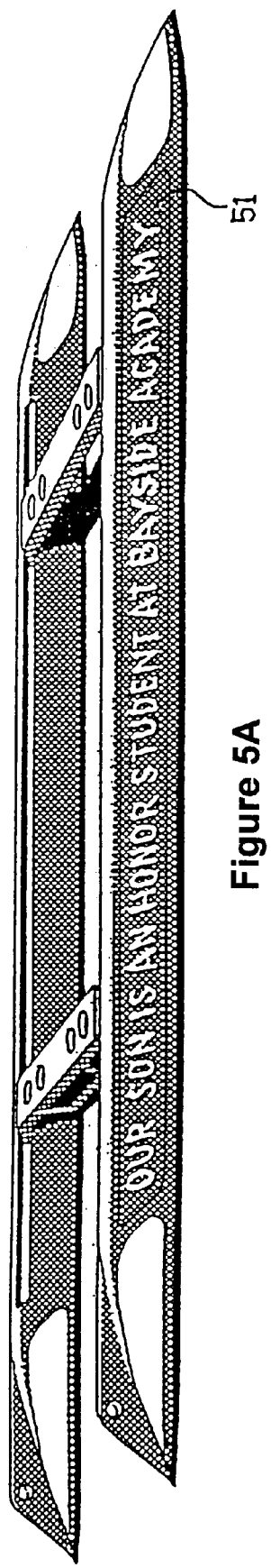
FIG. 5A shows an embodiment of the invention wherein illuminated messages may be used as an alternative to discrete or continuous lights.
Figure 5B:
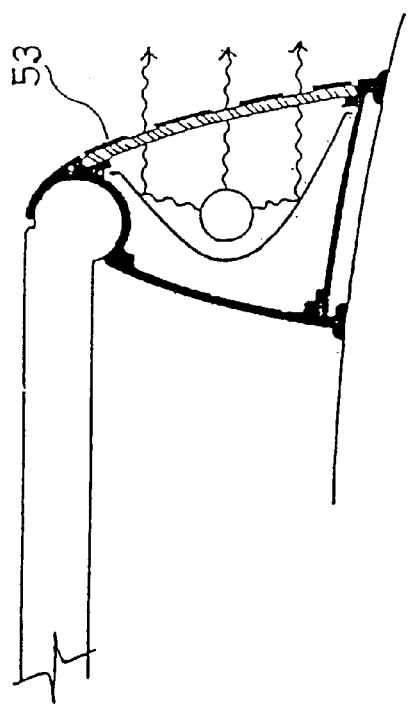
FIG. 5B is a cross-section of the outer sidewall of FIG. 5A, including light-passable openings that can be a permanent fixed part of the structure or removable for repairing or for installing different decorations or messages.

Such lamps may be attached to the outer surfaces of roof-racks, be partially or wholly set-in, or be contained inside, emitting light to outside through holes, slots or transparent or translucent materials, colored or clear, as perhaps better understood with reference to FIG. 5B, 7C and 7D.

FIG. 5A shows an embodiment of the invention wherein illuminated messages may be used as an alternative to discrete or continuous lights. In this case illumination sources are located inside a removable side member 51 having openings that can be shaped and colored for decorative purposes or to form letters to convey information. Various transparent signs or decorations can be affixed over the illumination sources so that the light therefrom projects through the transparent or translucent openings. The messages may be of any form, such pride-related, and so forth, or may be used for emergency messaging such as "CALL POLICE" or "SEND HELP."

Referring to FIG. 5B, the outer sidewall including the light-passable openings can be a permanent fixed part of the structure or, alternatively, can be removable for repairing or for installing different decorations or messages, either standard productions or custom-made. As one example, the signage panel can be made of transparent or translucent material covered or coated with opaque material such as paint, plastic or metal through which openings have been made or left let light from an inside lamp pass through to define decorations or letters to be seen from outside.

As an alternative, the sign may be made of solid opaque material having openings through which the light (as above) can pass. These openings can have transparent or translucent materials inserted into them to prevent admission of harmful substances or for artistic or decorative purposes.

The inside lamp or the transparent or translucent materials may be made of clear or colored material or may be coated with colored materials or substances to show or transmit artistic effects of one or more colors. In addition, without an internal reflector as shown, all or part of the structural walls of this roof-rack may be made of transparent or translucent or frosted material so that light emitted from the inside lamp (or lamps) would pass out all around to make the roof-rack appear to glow.

Figure 6U:
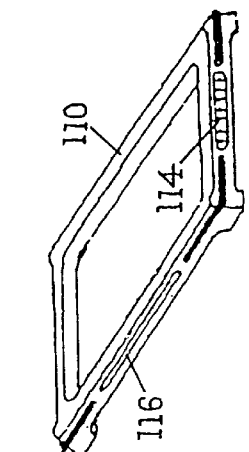
FIGS. 6A–6AA are represent alternative embodiments of a luggage carrier with illumination means according to the invention.
Figure 6T:
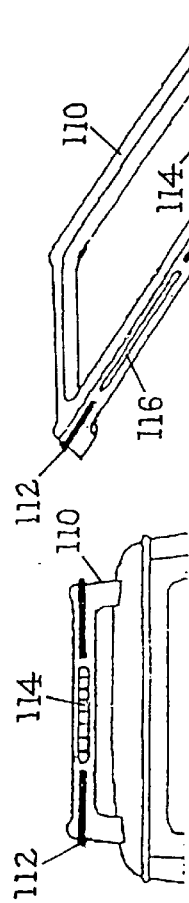
Figure 6S:
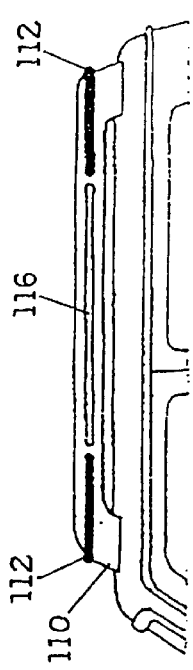
Figure 6X:
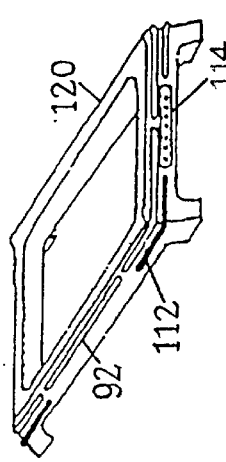
Figure 6W:
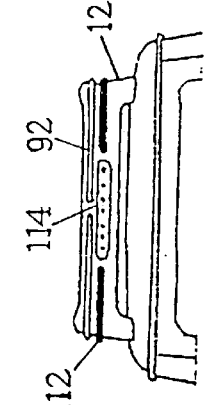
Figure 6V:
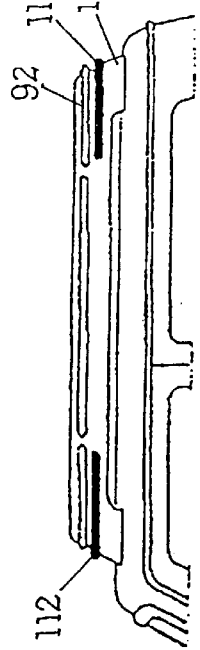
Figure 6A:
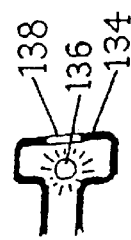
Figure 6Z:
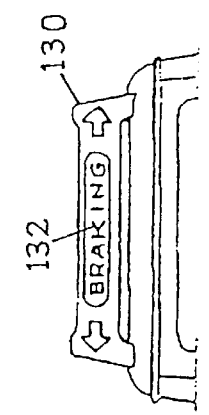

Referring now to FIGS. 6A–6AA, multiple alternative embodiments of the invention are shown to illustrate variations on the type of illumination that may be used. In the embodiment of FIG. 6A–6C, a plurality of small individual lamps 54 are integrated into the outwardly facing sides of the side members 56 and the transverse members 58 of the luggage carrier 52. The small lamps 54 may be any color but are preferably not red or amber which are colors reserved for turn signals and brake lamps. Especially simple wiring is possible because all the lamps 54 are the same color and can be illuminated together by a single power supply. This embodiment primarily enhances the overall visibility of the vehicle and provide enhanced aesthetics.

In FIGS. 6D–6F, a plurality of individual small lamps are separately electrified in multiple groups. A first group of lamps 62, indicated by solid dots, are amber in color and illuminate along with the vehicle's turn signals. This group comprises those lamps located adjacent the corners of the luggage carrier 60.

A second group of lamps 64, indicated by open circles with dots in the centers, are red in color and illuminate along with the brake lamps of the vehicle in order to indicate the application of the vehicle's brakes. This group comprises those lamps located near the center of a second transverse member 66 so that they are visible to the rear of the vehicle. A third group of lamps 68, indicated by open circles, are some color other than amber or red and provide enhanced visibility to the vehicle and enhanced aesthetics. The three groups of lamps 62, 64, and 68 together form a continuous evenly spaced row around the entire outward perimeter of the luggage carrier 60. Alternatively, the lamps in the first two groups, 62 and 64, used to indicate turning and braking, could be capable of more than one color so that they could be illuminated for visibility with the third group 68, and switch to amber or red to indicate turning or braking.

The embodiment of a roof-rack 70 in FIGS. 6G–6I is similar to the previous embodiment (FIGS. 6D–6F), except that the three groups of lamps, 62, 64 and 68, are physically separated from one another as shown instead of residing in continuous rows. Gaps 72 are left in the row to separate the various groups.

In the embodiment of FIGS. 6J–6L, a luggage carrier 80 includes a plurality of non-amber/non-red lamps 82 in a continuous row around the exterior perimeter of the luggage carrier 80 as in FIGS. 6A–6C. In addition, this embodiment includes additional amber lamps 84 and red lamps 86 located at the corners and rear of the luggage carrier 80, respectively. These additional lamps 84 and 86 are positioned below the continuous row of individual lamps 82. The continuous row of individual lamps 82 is illuminated in a color other than amber or red and provide increased vehicle visibility and aesthetics while the additional lamps 84 and 86 are selectively illuminated to indicate the driver's intention to turn or brake, without interfering with the illumination of the continuous row of individual lamps 82.

The embodiment of a luggage carrier 90 in FIGS. 6M–6O is similar to the embodiment shown in FIGS. 6D–6F except that the lamps capable of indicating turning 62 and braking 64 are interspersed with those that are continuously illuminated 68, as shown. In FIGS. 6P–6R, tubular lamps 92 are affixed around the perimeter of the roof rack 100 so as to give a continuous line of illumination. The tubular lamps 92 may be any color other than red or amber.

FIGS. 6S–6U illustrate a different luggage carrier 110, wherein tubular lamps of various colors are arranged in a continuous row around the perimeter of the luggage rack 110 so as to provide amber tubular lamps 112 at the corners, a red tubular lamp 114 at the rear and some other color of illumination 116 around the remaining perimeter as shown.

The embodiment shown in FIGS. 6V–6X combines the attributes of the previous two embodiments with a continuous row of non-amber/non-red tubular lamps 92 arranged around the perimeter of a luggage carrier 120 and separate amber 112 and red 114 tubular lamps positioned below the row 92 and arranged to provide turning and braking indication as shown.

Figure 6Y:
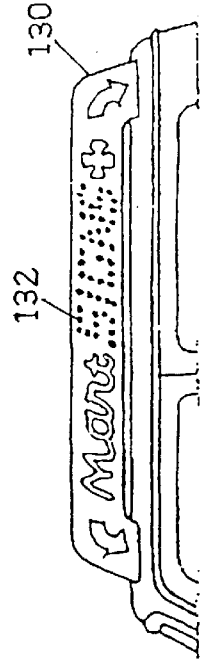

The luggage carrier 130 of FIGS. 6Y–6AA is related to that shown in FIGS. 5A and 5B in that it includes one or more illuminated signs 132 integrated into the exterior surfaces of the luggage carrier 130. This embodiment is used to shown that in addition to side messages, back message (such as "BRAKING") may be accommodated. In addition, arrows or 15 other graphical indicia may be used instead of non-graphical lights for turn indicators or for other purposes.

FIGS. 7A–7D illustrate an embodiment of the invention wherein downwardly directed lights are provided to illuminate at least portions of the top surface(s) of the vehicle. This type of illumination would make it easier to load a luggage carrier and also would provide an interesting aesthetic look. Note in FIG. 7A that the brake lights and front and rear turn indicators are, in fact, optional.

FIG. 7B is an oblique representation of the underside of the carrier, showing how the side and/or cross members may include light sources. FIG. 7C illustrates in cross section how the underside of the side bars may be illuminated, whereas FIG. 7D depicts a cross-bar section. As discussed above, if the cross-bars are moveable, electrified tracks may be provided, much like systems in use for track lighting.

Figure 8A:
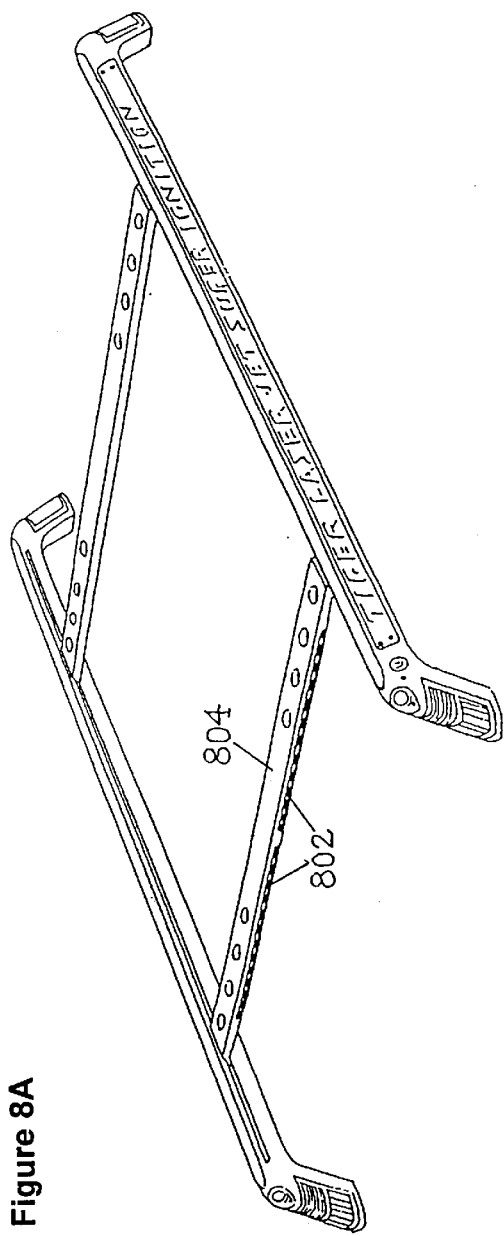
FIGS. 8A–8C illustrate, from different perspectives, various alternative, if not optional, aspects of the invention, including a rear-view video lens, back-up audible alarm, and other features.
Figure 8C:
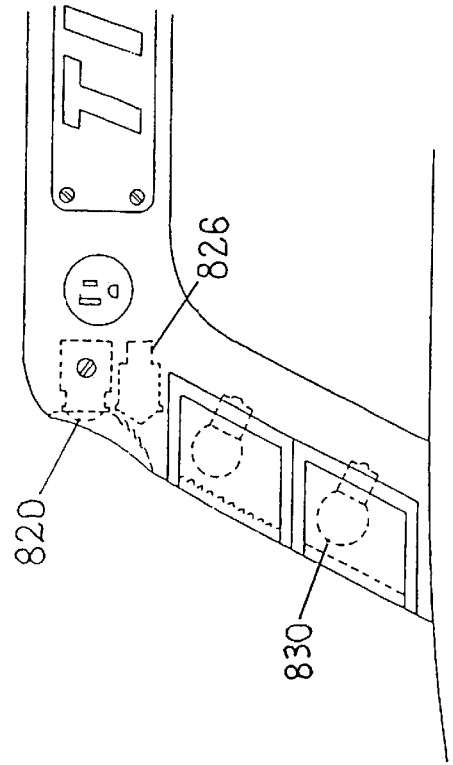

Now turning FIG. 8, there is shown, in FIGS. 8A8C, alternative arrangements according to the invention. In particular, FIG. 8A illustrates a rear, three-quarter isometric view of an alternative embodiment of a roof-rack according to the invention wherein braking lamps 802 are provided on a rear, transverse member 804. As with other embodiments according to the invention, in the event that multiple, discrete light emitters are used as the braking lamps, they may be automatically sequenced according to known electronic circuitry to provide a better indication of driver intent. For example, in making a right-hand turn, the lamps 802 to the right portion of the member 804 may begin an illumination pattern toward the middle area of the member 804, and sequence outwardly toward the rightward stantion in accordance with a right-hand turn-signal indication. A mirror-image version of this sequencing could be effectuated to indicate a left-hand turn, whereas, to indicate braking, all of the emitters making up the lamps would be actuated in accordance with braking operation. Although the 802 are termed "braking lamps" they may provide this alternative turn-indication function whether or not separate indicator lamps such as 830 are provided on the side stantion members.

Figure 8B:
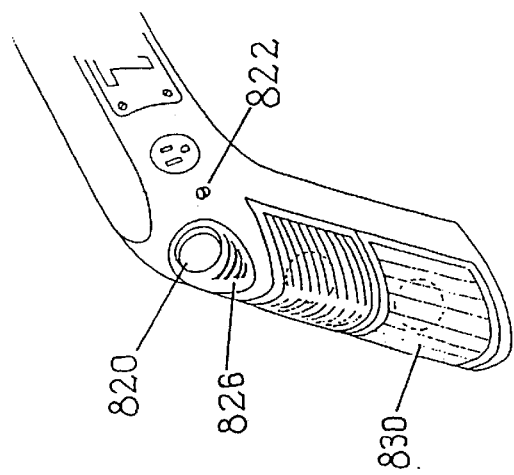

Continuing the reference to FIGS. 8A–8C, in the embodiment of the invention, a rear-view video camera or lens assembly 820 may be provided as shown on either of the two side-mounted stantions, with an optional screw 822 or other mechanical means being provided to adjust the viewing angle of the lens or camera in accordance with vehicle operator preference. In addition to the video capability, a back-up audible alarm 826 may be provided as well, which may take the form of a buzzer, bell, horn or other suitable audible means.

As shown in FIG. 9, as an alternative to the mounting of video and/or back-up audible alarms on the right and left stationary stantion members, as shown in FIG. 8, such capabilities may be provided centrally with respect to a "pod" 902 formed integrally or mounted on a rear cross bar 904. Such a configuration may be preferable in that a camera or lens from this angle may provide a more centrally oriented rearward field of view. In addition, in this and the configuration of FIGS. 8A–8C, the camera or lens may be mounted on a swivel-type housing 910 beneath the pod, thereby permitting relatively easy operator adjustment. The underside mounting, however, would protect the housing 910 from luggage or other loads mounted on top of the carrier proper.

Figure 10A:
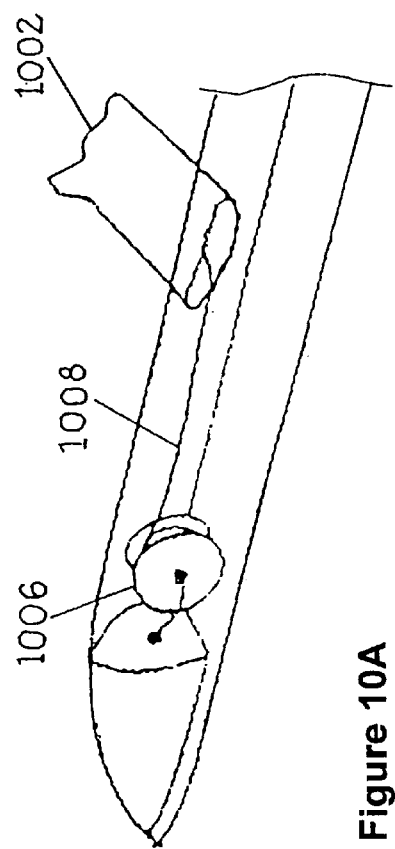
FIGS. 10A–10B represent partial views of alternative apparatus and methods for providing electrical connections to a movable transverse member according to the invention.
Figure 10B:
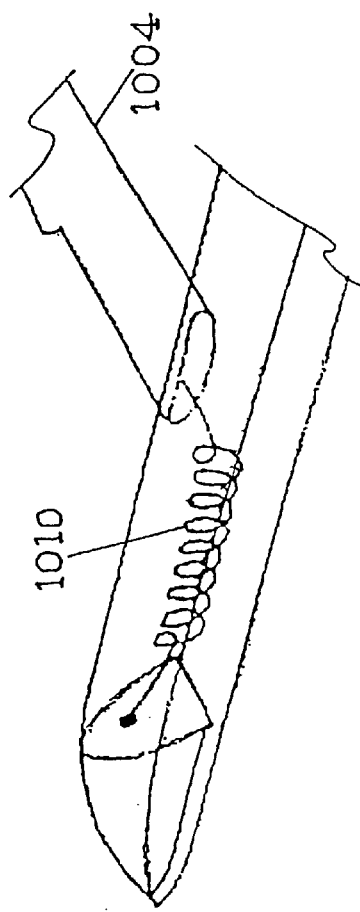

FIG. 10A and 10B illustrate alternative methods and apparatus for delivering electrical power to a movable transverse member 1002 or 1004. In particular, in the embodiment illustrated in FIG. 10A, a spring-loaded reel 1006 may be used to unroll and roll a cable 1008 to transverse member 1002. As shown in FIG. 10B, a coiled cable 1010 may alternative be used for such a purpose. These or other suitable alternatives may be more desirable to the track-light type of arrangement discussed above, in that the transverse members need not move that far forwardly and rearwardly in the application of the invention and, moreover, in the event that the member includes sophisticated capabilities such as a video camera means, multiple electrical conductors may be required.

Luggage carriers according to the invention may also be modified in other ways without departing from the spirit of the invention. For example, the luggage carrier may include more or fewer transverse members. It is also possible to construct the luggage carrier with a variety of differently shaped side and transverse members depending on the application and desired styling. Indeed, although the term "roof rack" is used extensively herein, various aspects of the invention may be used in conjunction with luggage carriers located elsewhere on a vehicle, such as trunk or decklids. In such a case, the carrier may take advantage of all rearward-facing mechanisms disclosed herein, such as braking lights, back-up lights, turn indicators, video cameras, audible back-up alarms, and so forth, though the frontward facing running lights and/or turn indicators, for example, would preferably be toned down or eliminated so as not to be disruptive to the driver or passengers within the vehicle. Side-lighting on a trunk or deck carrier could, however, also be provided according to the invention.

Variations on the type of illumination are also possible. The lamps may be simple incandescent light bulbs located at each illumination point or florescent bulbs may be employed. As a further alternative, fiber optics or light pipes based upon Lucite plastic, for example, may be used to reduce the total number of individual light sources required by routing the light to each desired location from one or more main sources. In addition, as well as the use of electronic circuitry to perform a sequencing function of the turn indicators as discussed above, circuitry may also be provided with suitable switch means to cause one or more of the lights on the inventive rack to function in a safety-flasher mode.

Overall, the inventive roof-racks afford enhanced driving safety, especially in dark or in inclement weather driving conditions, by placing turn indicator lights, rear facing braking lights, and/or noticeably visible side-facing lights as high up on the vehicle as possible. As a consequence, these important lights are made visible over other vehicles, boats or trailers. Vehicles bearing these roof-racks may be used for towing while being sprayed with wet weather road spume often raised to window levels by densely spaced fast-moving traffic, particularly in multi-lane expressways. Additional benefits include the provision of convenient electrical power outlets and wide-based lengthwise side-bars for improved spread of rack loads onto thin roof sheet-metal.

Although the improvements made possible by the invention will no doubt enhance commercialism, driver satisfaction, and/or decorative appeal, it is also expected that the inventive principles disclosed herein will induce vehicle owners to enhance their safety by making their cars more visible, and their intentions more evident, particularly in dark or in adverse visibility conditions. Roof-rack illumination was chosen because heights further above the road surface are becoming more important in terms of visibility as greater numbers of larger vehicles, such as sport-utilities and pick-ups, are being sold and driven in increasingly faster and more crowded traffic. Future population growth can only increase this necessity.

We claim:

1. A luggage carrier for use with a vehicle equipped with electrical wiring, comprising:
    first and second elongated rigid side members, each side member having forward and rearward portions and an outwardly exposed illuminated sidewall in electrical communication with the electrical wiring; and
    illuminated turn indicators in electrical communication with the electrical wiring, including at least one pair of indicators at the forward or rearward portions of the first and second rigid side members.

2. The luggage carrier of claim 1, further including a pair of indicators at both the forward and rear end portions of the first and second members.

3. The luggage carrier of claim 1, wherein the vehicle includes a source of line voltage and the carrier includes an electrical outlet disposed on one of the side members to supply the line voltage.

4. The luggage carrier of claim 1, wherein each outwardly exposed sidewall is illuminated with a plurality of discrete light emitters.

5. The luggage carrier of claim 1, wherein each outwardly exposed sidewall is illuminated with a single light emitter disposed within a respective elongated member and one or more apertures formed in the sidewall through which the light emerges.

6. The luggage carrier of claim 1, further including front and rear transverse members, each bridging the side members.

7. The luggage carrier of claim 1, wherein at least the rear transverse member further includes a rearwardly oriented light source.

8. The luggage carrier of claim 1, wherein:
    one or both of the transverse members are forwardly and rearwardly moveable with respect to the side members; and
    electrical power is supplied to the light source on the transverse member through wiring disposed on a retracting spool within one of the side members as the position of the transverse member is changed.

9. The luggage carrier of claim 1, wherein:
    one or both of the transverse members are forwardly and rearwardly moveable with respect to the side members; and
    electrical power is supplied to the light source on the transverse member through a wiring from a retracting coil as the position of the transverse member is changed.

10. The luggage carrier of claim 1, wherein:
    the side members are attached to the vehicle at their end portions;
    each side member has a body having a bottom surface which is spaced apart from the surface of the vehicle; and
    a source of light is disposed along the bottom surface of each side member.

11. The luggage carrier of claim 1, further including:
    front and rear transverse members bridging the side members, each transverse member having a bottom surface which is spaced apart from the surface of the vehicle; and
    a source of light is disposed along the bottom surface of at least one of the transverse members.

12. A luggage carrier for use with a vehicle equipped with electrical wiring, comprising:
    first and second elongated rigid side members, each side member having forward and rear end portions and an outwardly exposed sidewall;
    front and rear transverse members each bridging the side members, thereby forming two forward and two rearward corners where the side and transverse members meet; and
    illuminated turn indicators in electrical communication with the electrical wiring, including at least one pair of indicators disposed proximate to the forward or corners, and at least one pair of indicators disposed proximate to the rearward corners.

13. The luggage carrier of claim 12, wherein the vehicle includes a source of line voltage and the carrier includes an electrical outlet disposed on at least one of the side and transverse members to supply the line voltage.

14. The luggage carrier of claim 12, further including a source of illumination visible on the outwardly exposed sidewalls of the elongated members.

15. The luggage carrier of claim 12, wherein the source of illumination is in the form of a plurality of discrete light emitters.

16. The luggage carrier of claim 15, wherein the source of illumination includes a single light emitter disposed within each elongated member and one or more apertures formed in the sidewall through which the light emerges.

17. The luggage carrier of claim 12, wherein at least the rear transverse member further includes a rearwardly oriented light source.

18. The luggage carrier of claim 12, wherein:
   the side and transverse members each have a bottom surface which is spaced apart from the surface of the vehicle; and
   a source of light is disposed along the bottom surface of at least one of the members.

19. The luggage carrier of claim 12, wherein:
   the turn indicators are disposed on the rearward-facing surface of the rearward transverse member; and
   the indicators are of the type which use a series of discrete emitters that operate sequentially to indicate movement toward the side of the vehicle associated with the turn as indicated.

20. A luggage carrier for use with a vehicle equipped with a source of line voltage, the luggage carrier comprising:
   first and second elongated rigid side members, each side member having forward and rearward portions and an outwardly exposed sidewalls;
   illuminated turn indicators in electrical communication with the electrical wiring, including at least one pair of indicators at the forward or rearward portions of the first and second rigid side members; and
   an electrical outlet disposed on at least one of the side and transverse members to supply tie line voltage.

* * * * *